United States Patent [19]

Williams

[11] Patent Number: 4,685,501

[45] Date of Patent: Aug. 11, 1987

[54] REMOTELY CONTROLLED INFLATION/DEFLATION VALVE SYSTEM FOR A VEHICLE TIRE

[76] Inventor: Donald E. Williams, 3252 Wyndhurst Ct., Dayton, Ohio 45440

[21] Appl. No.: 837,054

[22] Filed: Mar. 6, 1986

[51] Int. Cl.$^4$ .................... B60C 23/00; B60C 29/00
[52] U.S. Cl. ................... 152/417; 137/487.5; 152/415
[58] Field of Search .............. 152/415, 416, 417, 427; 141/38, 95; 340/58; 200/61.25; 137/487.5, 224

[56] References Cited

U.S. PATENT DOCUMENTS

| | | | |
|---|---|---|---|
| 2,685,906 | 8/1954 | Williams | 152/417 |
| 2,693,841 | 11/1954 | Webster, Jr. | 152/417 |
| 2,747,640 | 5/1956 | Kress | 152/417 |
| 2,989,999 | 6/1961 | Holbrook et al. | 152/416 |
| 3,361,180 | 1/1968 | Neilson et al. | 152/415 |
| 4,330,774 | 5/1982 | Doty | 340/58 |

FOREIGN PATENT DOCUMENTS 0716880 8/1965 Canada ................ 152/415

Primary Examiner—Donald E. Czaja
Assistant Examiner—Ramon R. Hoch
Attorney, Agent, or Firm—Killworth, Gottman, Hagan & Schaeff

[57] ABSTRACT

A valve system for remotely controlling the inflation pressure within a pneumatic tire of a wheel mounted for rotation on an axle of a vehicle includes several improvements. One improvement is a spool valve assembly disposed in a housing mounted within the axle. The spool valve assembly is carried by and rotates with an air manifold formed on the interior of the wheel hub cap. Another improvement is an electrical pressure transducer for monitoring the pressure in the air manifold which is mounted to the manifold and rotates therewith. A pair of electrical inductive coupling rings attached respectively to the housing and spool valve body electrically couple a stationary leading portion of an electrical signal transmitting cable to a trailing portion thereof which is attached to the transducer and moves therewith. A further improvement is a sealing assembly disposed between the housing and spool valve body adjacent the inductive coupling rings. The sealing assembly includes a flexible ring and an expanded flexible band which seats in a curled inner edge of the ring for establishing an air-tight seal between the curled edge of the ring and the valve body when the inflation/deflation function is in operation.

20 Claims, 4 Drawing Figures

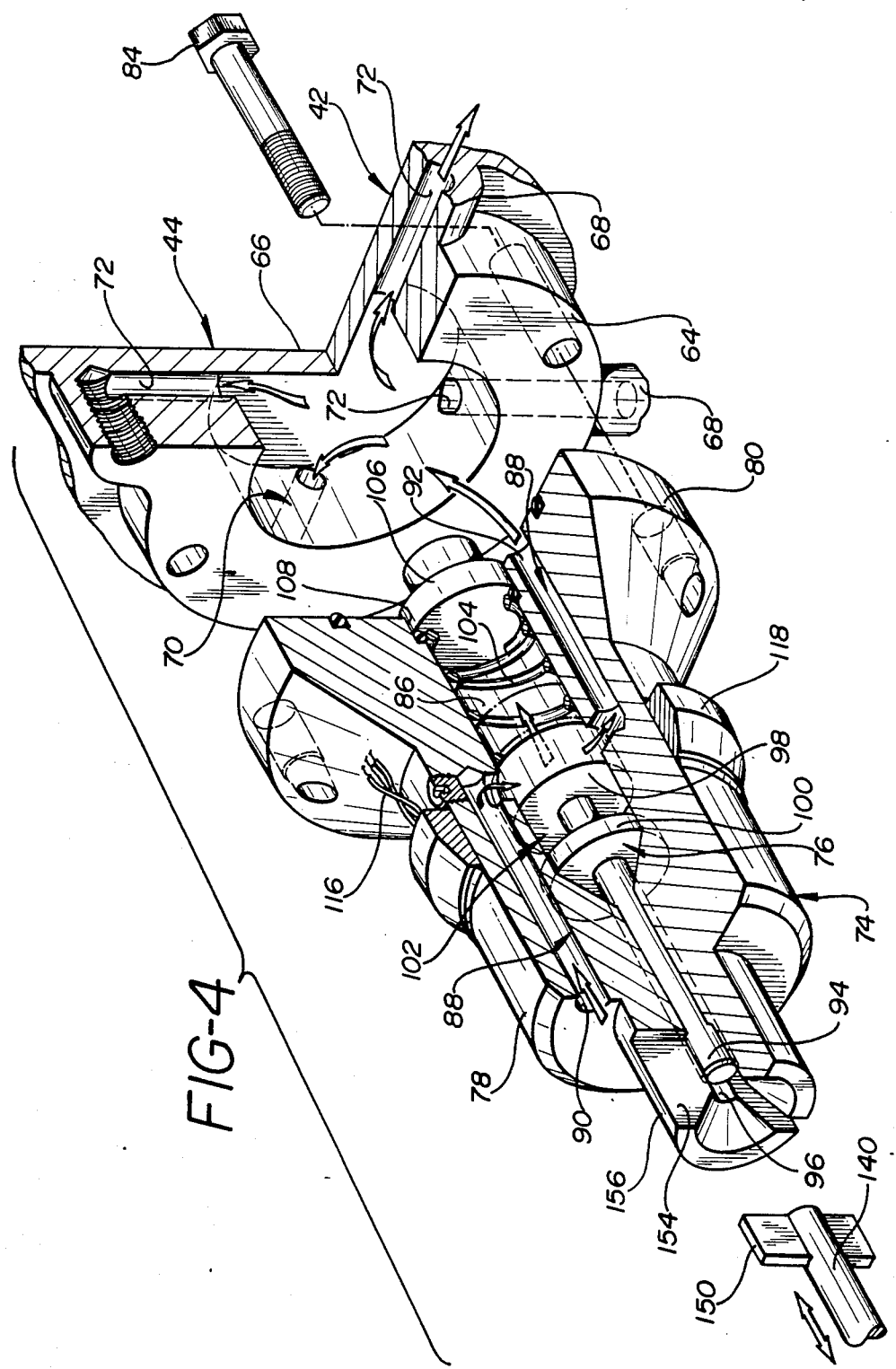

REMOTELY CONTROLLED INFLATION/DEFLATION VALVE SYSTEM FOR A VEHICLE TIRE

CROSS-REFERENCE TO RELATED APPLICATION

Reference is hereby made to the following U.S. application dealing with subject matter related to the present invention: "Remotely Controlled Aircraft Tire Inflation/Deflation Valve" by Donald E. Williams, assigned U.S. Ser. No. 594,615, now abondoned.

BACKGROUND OF THE INVENTION

The present invention generally relates to devices for controlling pressure within pneumatic tires and, more particularly, to an improved remotely controlled valve system through which a vehicle tire may be inflated or deflated.

In the operation of wheeled vehicles carried by pneumatic tires, it is frequently desirable to control the inflation pressure within the tires for optimum operational efficiency of the tires and the wheeled vehicle under various operating and road conditions. The adjustment of inflation pressure to fit the particular operating and road conditions extends the tread life of the tires, is a prudent anti-skid precautionary measure, provides blow-out protection, and is justifiable for other safety and economy reasons.

Inflation pressure control is especially important in the operation of large aircraft. For example, optimum tire performance may be obtained using relatively high inflation pressure for take-off, and relatively low inflation pressure for landing. These desirable inflation levels may be variable depending upon weather and runway surface conditions. Further, and especially as applied to the large transport and tanker aircraft, large changes in the gross weight of the aircraft may occur during its mission, such as by personnel or equipment deployment or by inflight transfer of aircraft fuel. Suitable control of the inflation pressure of the tires of the aircraft will provide proper reduced pressure consistent with the landing weight of the aircraft upon termination of the mission. When landing on unimproved airfields, control of the inflation pressure affords maximum flotation capability to the aircraft, and the footprint size is optimized for improved ground control and braking capability on any runway surface. Tire tread life may be extended by as much as 100% by judicious control of the tire inflation pressure.

Systems for effecting and controlling inflation and deflation of pneumatic tires on a vehicle while the vehicle is at rest or in motion are known in the prior art. Representative of such prior art are the systems disclosed in U.S. Patents to Williams (U.S. Pat. No. 2,685,906) and Kress (U.S. Pat. No. 2,747,640). The system of the Williams patent employs inflation pressure control apparatus mounted on the exterior of the wheel hub, whereas the system of the Kress patent provides apparatus mounted in the wheel axle. The systems of both patents incorporate a check valve aligned with and displaceable by a plunger. Pressurized air is used to drive the plunger to open the check valve as well as to inflate the tire.

More recently, a system has been devised by the applicant herein and disclosed in the application cross-referenced above which uses a plunger actuated by an electrical solenoid, as opposed to a plunger actuated by air, to open a poppet valve for routing pressurized air to inflate the tire. Employment of a solenoid-actuated plunger contributes to a reduction of the overall complexity of the apparatus compared to those disclosed in the two mentioned patents and enhances its reliability in terms of the need for fewer air pressure seals. The apparatus disclosed by applicant in his cross-referenced application is believed preferable over those of the cited patents in terms of its construction and function.

However, it has recently been recognized that there are areas in the design of applicant's apparatus that need to be improved. First, the space occupied by the poppet valve and inner manifold housing seems excessive and thus an alternative construction in this area of the apparatus which requires less space would be desirable. Second, the size of the outer manifold housing and its deployment on the exterior of the hub cap has drawbacks in terms of its bulkiness and exposure to possible damage. Third, the apparatus fails to provide any means to monitor the inflation pressure of each tire without actually actuating the solenoid-operated plunger to open the poppet valve in order to establish communication between the tire and the pneumatic controller of the system.

SUMMARY OF THE INVENTION

The present invention provides improvements in the design of applicant's remotely controlled valve system which eliminate the drawbacks mentioned above. One of these improvements is directed to the components of a valve assembly disposed in a housing mounted within the axle of the vehicle. The valve assembly includes a valve body disposed in the housing and mounted to the an air manifold in the form of a ring attached on the interior of a hub cap connected to the wheel of the vehicle. The valve body rotates with the air manifold and hub cap relative to valve assembly housing and has a hollow chamber and an air passage defined therein. The air passage is composed of a first portion communicating at its outer end with the interior of the housing and at its inner end with the chamber and a second portion communicating at its inner end with the chamber and at its outer end with the air channel of the manifold. The valve assembly also includes a valve spool disposed in the valve body chamber and reciprocally movable therein between valve opening and closing positions. The spool has a recess defined therein which establishes communication between the inner ends of the first and second air passage portions in the body when the spool is moved to its valve opening position. Also, the spool has a land defined thereon which blocks communication between the inner ends of the first and second air passage portions in the body when the spool is moved to its valve closing position.

More particularly, the first and second portions of the air passage in the valve body extend in generally parallel relationship to one another and to the direction of movement of the valve spool in the chamber of the body, are displaced circumferentially about and radially from the chamber, and are offset axially from one another with their inner ends aligned with one another. The recess and land of the valve spool extend in generally transverse relationship to the direction of movement of spool in the chamber.

Another improvment of the present invention relates to an electrical pressure transducer mounted to the ring in the hub cap defining the manifold for movement therewith and being disposed in communication with the manifold air channel for sensing air pressure therein. Also, a cable for transmitting electrical signals includes a trailing portion connected to the transducer for movement therewith upon rotation of manifold, and a leading portion extending through the housing in a stationary relationship. A pair of inductive coupling rings are disposed between the rotatable valve body and the stationary housing for electrically coupling the leading and trailing portions of the electrical signal transmitting cable together. The inner ring rotates with the valve body, whereas the outer ring is stationary with the housing. This system is an improvement over the type that uses a slip ring in the hub cap coupled to a transducer mounted on the valve stem.

Still another improvement of the present invention is a sealing assembly disposed between the housing and valve body adjacent the electrical inductive coupling rings. The sealing assembly includes a flexible ring having an outer annular base portion engaged with the housing interior and an inner annular flexible wall portion adapted to engage the exterior of the valve body and form a curled inner peripheral edge which seats an expanded flexible band for establishing an air-tight seal between the curled edge of the ring and the valve body. No dynamic seals for purposes of holding the inflation pressure in the tire are required. In addition, the start-off is in the near vicinity of the tire and therefore any leaks upstream of the valve do not cause a loss of tire pressure.

Accordingly, it is an object of the present invention to provide an improved remotely controlled inflation/deflation valve assembly having a spool valve assembly carried by an air manifold formed on the interior of a hub cap of the vehicle wheel which occupies less space within the hollow axle of the vehicle; to provide a sealing assembly which improves the reliability of the air-tight seal between a valve body of the assembly and a housing in which the assembly is disposed; and to provide an inductive coupling between the housing and valve body which allows employment of an electrical pressure transducer at the location of the air manifold for continuous monitoring of the inflation pressure within the vehicle tire.

BRIEF DESCRIPTION OF THE DRAWINGS

FIG. 4 is an enlarged perspective view of the spool valve and interior air manifold of the improved valve assembly of FIG. 2, but with the valve being shown disassembled from the manifold and portions of each cut away to expose the respective interiors thereof.

DETAILED DESCRIPTION OF THE PREFERRED EMBODIMENT

Figure 1:
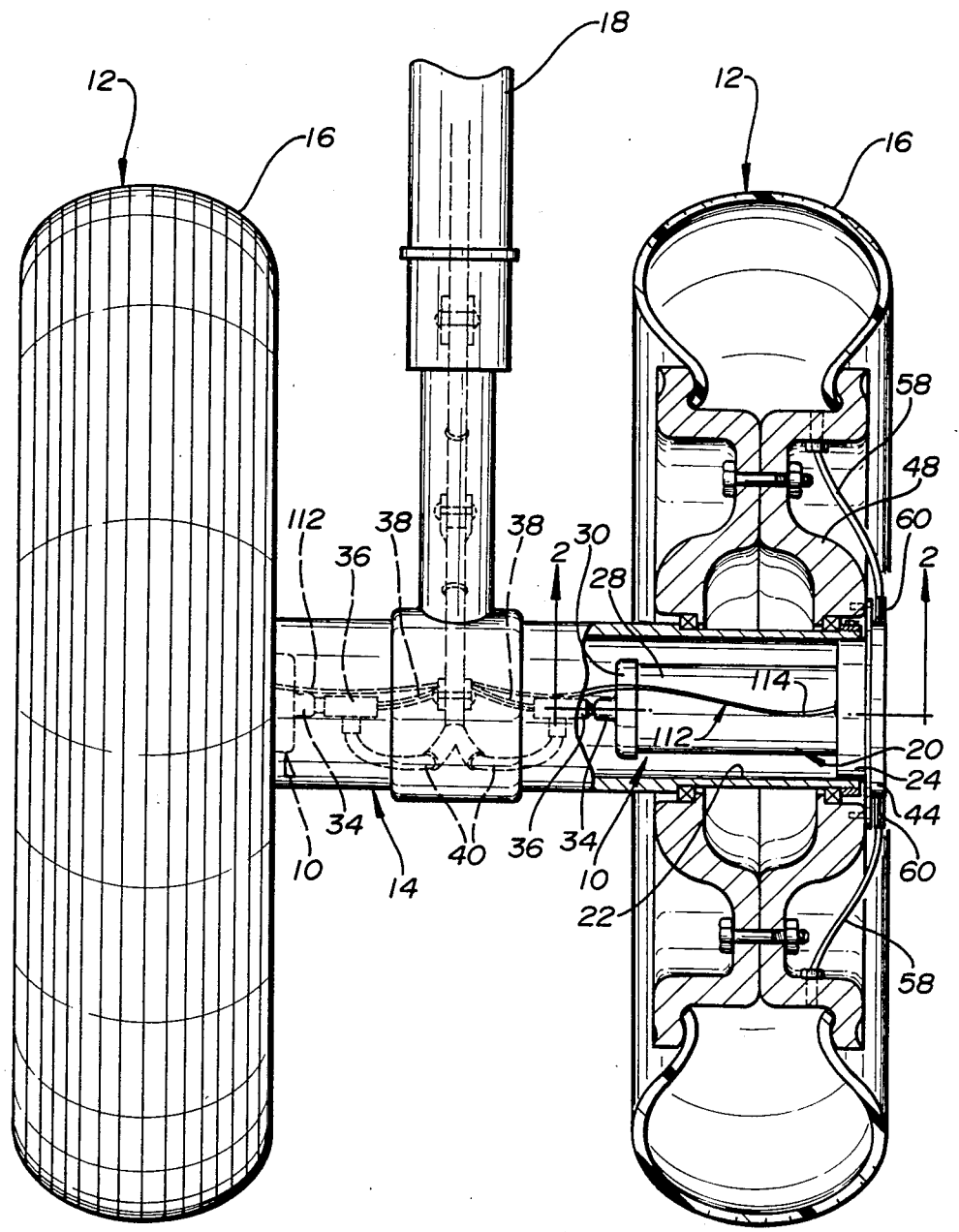
FIG. 1 is a front elevational view of a set of wheels and an axle of a vehicle, such as an aircraft, with portions thereof cut away and sectioned to illustrate placement of the improved inflation/deflation valve assembly of the present invention and its associated power and pneumatic supply lines.

Reference is made to FIG. 1 of the drawings which depicts an improved valve assembly 10 associated with each wheel 12 in a set thereof rotatably mounted on opposite ends of a hollow axle 14. The improved valve assembly 10 is part of a valve system which is described briefly and illustrated schematically in the application cross-reference above, the disclosure of which is incorporated herein by reference. The valve system is operable for remotely controlling the inflation pressure within the pneumatic tires 16 of the respective wheels 12. Specifically, FIG. 1 illustrates a hollow axle 14 of an aircraft which is supported thereabove by a strut 18 and the preferred placement of the improved valve assembly 10 therein.

Figure 2:
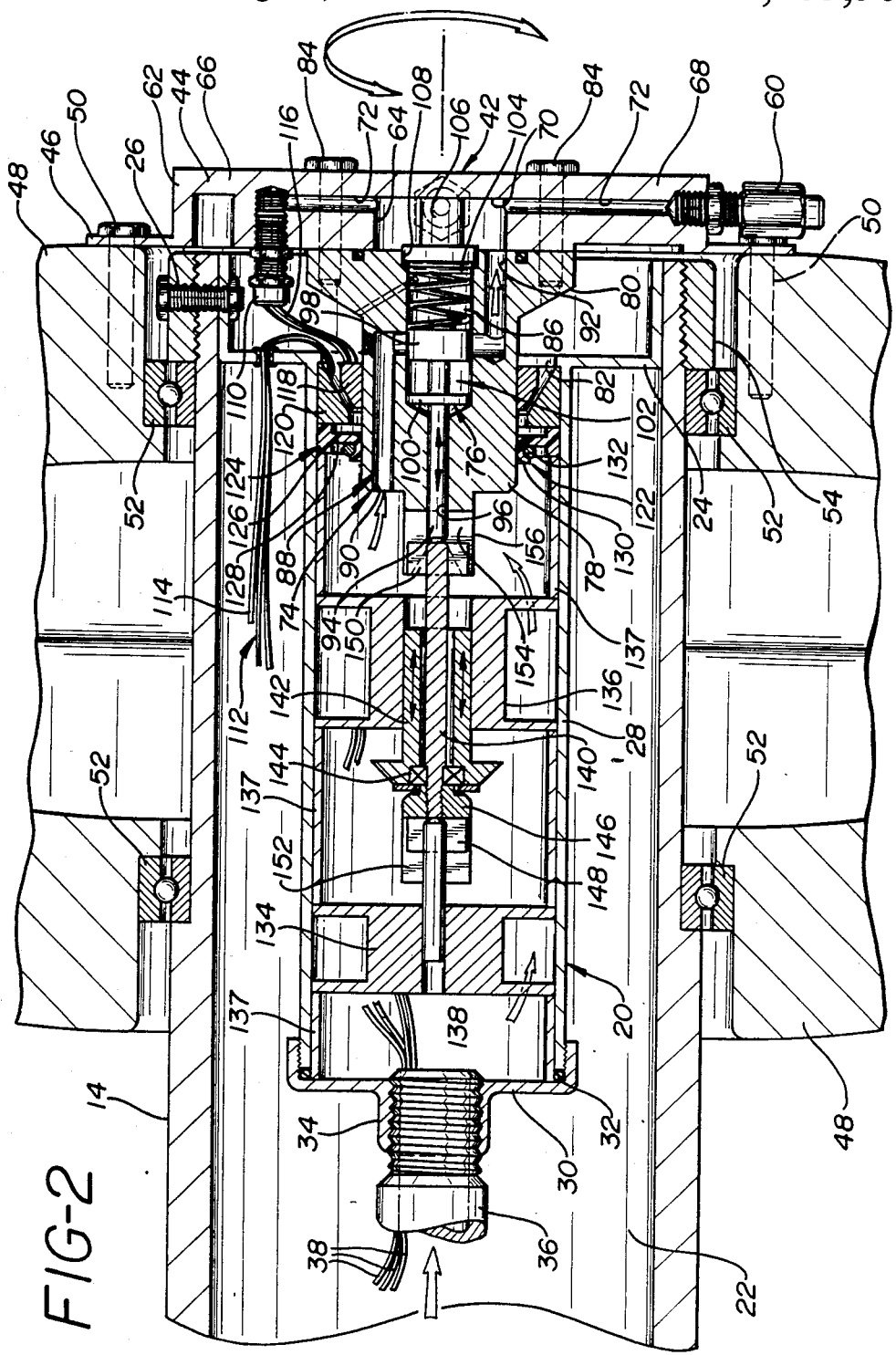
FIG. 2 is an enlarged axial sectional view of a fragmentary portion of the axle, wheel and tire and of the improved valve assembly taken along line 2—2 of FIG. 1.

As seen in FIG. 1 and more clearly in FIG. 2, the improved valve assembly 10 includes a valve housing 20 stationarily disposed in a hollow cavity 22 of the axle proximate an outer end thereof. The housing 20 has a cylindrical mounting portion 24 sized to snugly fit within the cylindrical cavity 22 of the axle 14. The housing mounting portion 24 is disposed at the outer marginal edge portion of the axle 14 and attached thereto by a bolt 26. The remaining tubular portion 28 of the valve housing 20, which has a smaller diameter than the mounting portion 24, is supported in a cantilevered relationship from the mounting portion 24, extending inboard thereof and radially spaced inwardly from the axle 14. An end cap 30 is threaded onto the inboard end of the housing tubular portion 28 and a sealing ring 32 disposed in the cap 30 forms an air-tight seal therebetween. The end cap 30 has a central coupling 34 which threadably receives the end of an inlet tee 36 through which pressurized air and electrical wires 38 are supplied into the housing 20. The air is delivered from a suitable source through a hose 40 which with the wires 38 are routed along the strut 18 and into the axle 14 as shown in FIG. 1.

In addition to the valve housing 20, the improved valve assembly 10 includes an air manifold 42 which has a supporting superstructure in the form of a hub cap 44. The hub cap 44 has a peripheral flange 46 attached to the rim 48 of the wheel 12 by bolts 50. The wheel rim 48 supports the inflated tire 16 and in turn is rotatably mounted to the axle 14 by bearings 52 and an annular clamp ring 54 threaded on the outer marginal edge of the axle and locked thereon by the bolt 26.

Thus, the air manifold 42 is attached to the wheel 12 for rotation therewith and relative to the stationary valve housing 20. The hub cap superstructure 44 of the manifold 42 extends across the open outer end of the hollow axle cavity 22 and the outer mounting portion 24 of the housing 20. The integration of the air manifold and hub cap into one structure conserves and reduces the space required by the improved valve assembly 10 as compared to the earlier design in the referenced application.

Figure 3:
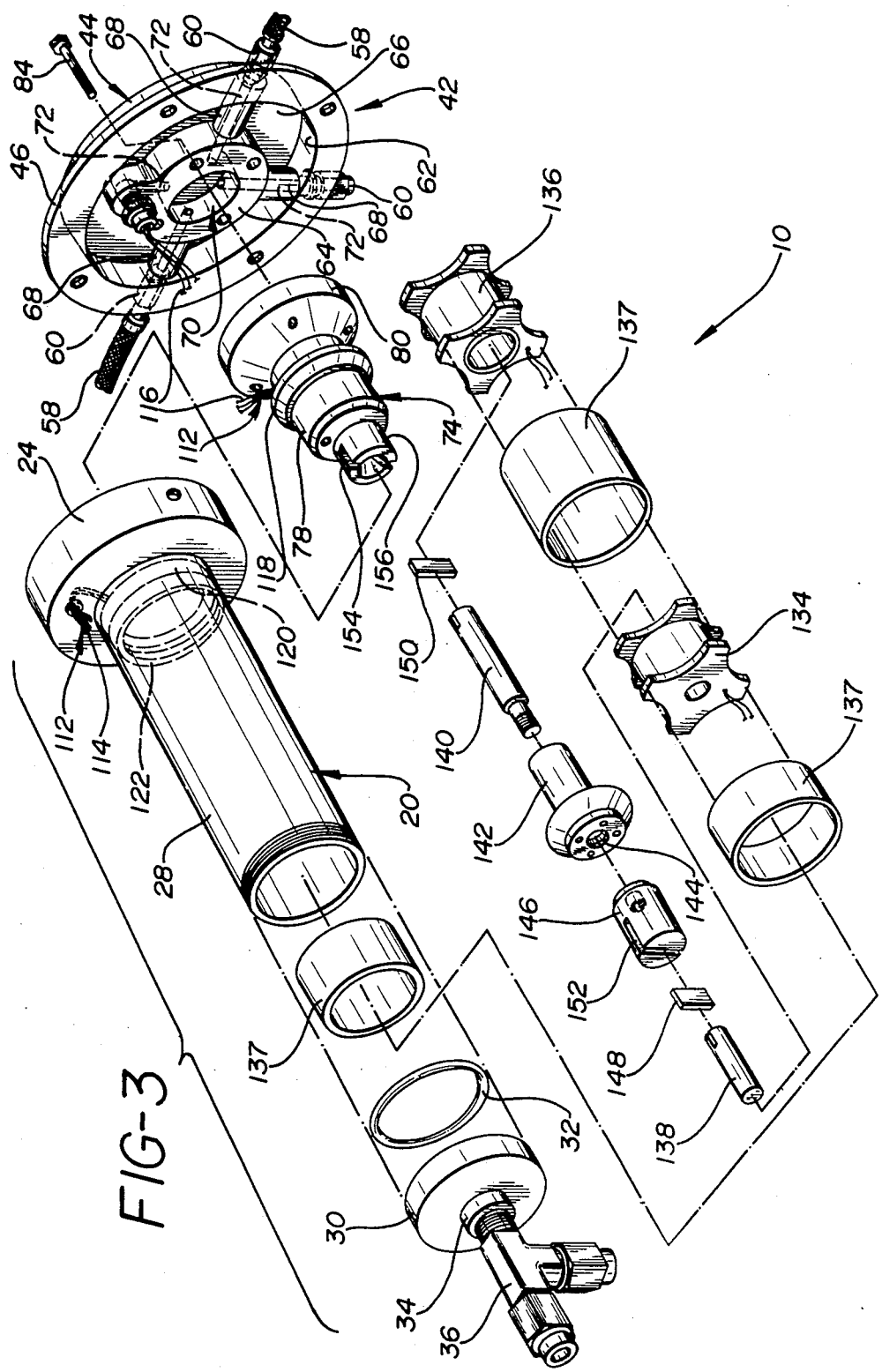
FIG. 3 is an exploded view of the improved valve assembly of FIG. 2, on a somewhat smaller scale.

In addition to the superstructure 44, the air manifold 42 is made up of components supported by the superstructure 44 and which define an air channel connectable in communication with the pneumatic tire 16 of the wheel 12 via air lines 58, as shown in FIG. 1. Specifically, as best seen in FIGS. 2 and 3 and partially in FIG. 4, the components of the air manifold 42 include a plurality of connectors 60 mounted on a peripheral side wall 62 of the hub cap superstructure 44, an inner ring 64 attached on the interior of an outer end plate 66 of the hub cap superstructure 44 and and plurality of sleeves 68 extending between the inner ring 64 and the connectors 60. The inner ring 64 defines a central portion 70 of the manifold air channel and the sleeves 68 define respective radial branches 72 of the air channel leading from the central portion 70 thereof to the connector 60.

Further, the improved valve assembly 10 includes a valve body 74 and a valve spool 76 reciprocal within the body. The valve body 74 has a generally cylindrical main portion 78 and a divergently tapering outer mounting portion 80. The main portion 78 of the valve body 74 is disposed generally inwardly of an outer open end 82 of the tubular portion 28 of the housing 20 and extends outwardly therethrough, whereas the outer mounting portion 80 of the housing 20 is disposed within the interior of the mounting portion 24 of the housing 20 adjacent the outer open end of the hollow axle cavity 22 covered by the hub cap superstructure 44 of the air manifold 42. The mounting portion 80 of the valve body 74 is attached to the inner ring 64 of the air manifold 42 by bolts 84 for rotation therewith relative to the valve housing 20. Similar to the mounting relationship of the housing 20, the valve body mounting portion 80 thus supports the main body portion 78 of the valve body 74 in a cantilevered relationship from the air manifold 42 with which it rotates with the manifold 42 and wheel 12.

The valve body 74 defines a central hollow chamber 86 within which the valve spool 76 can reciprocally move and an air passage 88 having an upper inner portion 90 located above the chamber 86 and a lower outer portion 92 located below the chamber 86, the portions 90,92 being displaced circumferentially about and radially outward from chamber. The upper air passage portion 90 communicates at its outer end with the interior of the tubular housing portion 28 and at its inner end with the chamber 86, whereas the lower air passage portion 92 communicates at its inner end with the chamber 86 and at its outer end with the central portion 70 of the air channel defined in the manifold 42. Also, the upper and lower air passage portions 90,92 in the valve body 74, preferably, extend generally parallel to one another and to the direction of movement of the valve spool 76 in the body chamber 86. However, the upper and lower air passage portions 90,92 are offset axially with respect to one another and are vertically aligned with one another at their respective inner ends which both communicate with the valve body chamber 86.

As mentioned above, the valve spool 76 is disposed in the chamber 86 of the valve body 74 for reciprocal movement. Basically, the valve spool 76 is movable relative to the valve body 74 between a valve closing position, as seen in FIGS. 2 and 4, and a valve opening (not shown) in which the spool 76 is displaced to the right of the illustrated closing position. The spool 76 includes an elongated central shaft 94 slidably mounted through a central bore 96 defined in the body 74 extending from the chamber 86 therein to the inner end of the body. The spool 76 also includes a pair of annular discs 98,100 mounted on the shaft 94 within the chamber 86, one disc 98 being much thicker than the other disc 100. The discs are axially spaced from one another along the shaft 94 so as to define an annular recess 102 therebetween having a width approximately equal to the thickness of the thicker one 98 of the two discs. The recess 102 is aligned with and establishes communication between the inner ends of upper and lower air passage portions 90,92 in the valve body 74 when the spool is moved to its valve opening position. On the other hand, as seen in FIGS. 2 and 4, the thicker one of the discs 98 which constitutes a land of the spool is aligned with the blocks communication between the inner ends of the upper and lower air passage portions 90,92 when the spool is moved to its valve closing position. It will be noted that the land or thicker disc 98 and the recess 102 extend in generally transverse relationship to the direction of movement of the spool 76 and axial direction of the air passages portions 90,92.

As seen in FIGS. 2 and 4, the hollow chamber 86 extends to the outer end of the valve body 74 for accommodating resilient means in the form of a coil spring 104 therein between the thicker disc 98 and a spring seat 106 closing the outer end of the chamber 86. The spring seat 106 is clamped between an annular shoulder 108 in the valve body 74 and the outer end plate 66 of the hub cap 44. The spring 104 is normally compressed to bias the valve spool 76 toward its valve closing position seen in FIG. 2.

The improved valve assembly 10 also includes an electrical pressure transducer 110 for monitoring the air pressure within the manifold 42 which closely approximates the inflation pressure in the tire 16. The transducer 110 is disposed adjacent the valve body 74 and mounted to the inner ring 64 of the manifold from a side thereof facing the hollow cavity 22 of the axle 14. The transducer 110 is disposed in communication with one of the radial branches 72 of the air channel in the manifold. In such manner, the transducer 110 is mounted so as to move with the manifold 42 and wheel 12. A flexible cable 112 extends along the exterior of the valve housing 20, as seen in FIGS. 1 and 2, for transmitting electrical signals from the transducer 110 to a pneumatic controller (not shown).

In order to accommodate rotation of the transducer 110 with the wheel 12 relative to the stationary valve housing 20, means are provided in the housing 20 near to the end thereof adjacent to the transducer 110 for electrically coupling a stationary leading portion 114 of the cable 112 to a moving trailing portion 116 thereof inductively. In other words, electrical signals transmitted from the transducer 110 by the trailing cable portion 116 which is attached to and moves with the transducer are received and then transmitted on by the leading cable portion 114 without the cable portions actually contacting one another. The inductive coupling means for accomplishing this takes the form of an inner ring 118 electrically connected to the trailing cable portion 116 and mounted to the exterior of the valve body 74 and in spaced relation to the interior of the housing 20, and an outer ring 120 electrically connected to the leading cable portion 114 and mounted to the interior of the housing 20 and in spaced relation to the inner ring 118 and the exterior of the valve body. The inner and outer rings 118,120 are composed of conductive material and the gap established therebetween is preset to achieve electrically inductive coupling between the rings for inductively transmitting signals between the leading and trailing portions 114,116 of the transmitting cable 112.

Lastly, the improved valve assembly 10 includes a sealing assembly 122 disposed between the valve body 74 and the housing 20 adjacent to the pair of inductive coupling rings 118,120. The sealing assembly 122 includes a flexible ring 124 having an outer annular base portion 126 engaged with the interior of the housing 20 and an inner annular flexible wall portion 128 adapted to engage the exterior of the valve body 74 and form a curled inner peripheral edge 130 thereon. An expanded flexible resilient band 132 seats in the curled inner edge 130 of the wall portion 128 and contacts the edge 130 for establishing an air-tight seal between the curled edge 130 of the ring 124 and the valve body 74. The curled edge 130 is oriented toward the interior of the housing 20 so that air pressure therein will tend to increase the pressure of the seal effected by the edge 130 against the valve body 74.

The remaining components incorporated in the improved valve assembly 10 are similar to ones present in the earlier design in the cross-referenced application and need not be described herein in detail in order to understanding the improvements provided herein. It will be seen that an anti-skid generator 134 and a solenoid 136 are disposed in tandem relationship with sleeves 137 disposed in alternating relation therebetween and also between the end cap 30 and the valve body 74 for holding the generator 134 and solenoid 136 in a stationary relationship within the housing 20. The electrical wires 38 are connected to the respective generator 134 and solenoid 136 for respectively transmitting and delivering sensing and actuating signals. Finally, an anti-skid generator shaft 138 and solenoid shaft and plunger 140,142 are provided. The solenoid shaft 140 is coupled by a thrust bearing 144 clamped between an end of the shaft and a bearing locking device 146 to move with the solenoid plunger 142 for causing movement of the valve shaft 94 and thereby the valve spool 76 between its valve opening and closing positions. The anti-skid generator shaft 138 is, in turn, moved by the locking device 146. Flat butterflies 148,150 on the ends of the shafts 138,140 interface with slots 152,154 in the locking device 146 and a connector 156 on the valve body 74 so as to make the shafts 138,140 rotate with the valve body, whereas the generator 134 and the solenoid 136 and its plunger 142 due to the thrust bearing 144 remain stationary. The peripheral configurations of the anti-skid generator 134 and solenoid 136 allow pressurized air entering the air-tight, sealed housing 20 from the tee 36 to flow past the generator 134 and solenoid 136 to the upper air passage portion 90, as indicated by the arrows in FIG. 2.

Having thus described the improvements of the present invention in detail and by reference to a preferred embodiment thereof, it will be apparent that modifications and variations are possible without departing from the scope of the invention defined in the appended claims.

What is claimed is:

1. A valve system for remotely controlling the inflation pressure within a pneumatic tire of a wheel mounted for rotation on an axle of a vehicle, the improvement comprising:
   a housing disposable in and attachable to said axle;
   an air manifold attachable to said wheel for rotation therewith and relative to said housing, said manifold having an air channel connectable in communication with said pneumatic tire of said wheel;
   a valve body disposable in said housing and being connectable to said air manifold for rotation therewith relative to said housing, said valve body having a hollow chamber and an air passage defined therein, said air passage having a first portion communicating at its outer end with the interior of said housing and at its inner end with said chamber and a second portion communicating at its inner end with said chamber and at its outer end with said air channel of said manifold when said valve body is disposed in said housing and connected to said manifold; and
   a valve spool disposed in said chamber of said valve body and reciprocally movable therein relative to said body between valve opening and closing positions, said spool having a recess defined therein which establishes communication between said inner ends of said first and second portions of said air passage in said body when said spool is moved to its valve opening position, said spool having a land defined thereon which blocks communication between said inner ends of said first and second portions of said air passage in said body when said spool is moved to its valve closing position.

2. The system of claim 1 in which said air manifold includes:
   an outer hub cap disposable across an end of said axle and said housing;
   a connector mounted on the periphery of said hub cap;
   an inner ring attached on the interior of said hub cap and defining a central portion of said air channel therewith; and
   at least one sleeve extending between said ring and said connector on the periphery of said hub cap for defining a branch of said air channel leading from said central portion thereof to said connector.

3. The system of claim 1 in which said first and second portions of said air passage in said valve body extend in generally parallel relationship to one another and to the direction of movement of said valve spool in said chamber of said body, and
   are displaced circumferentially about and radially from said chamber in said body.

4. The system of claim 3 in which said first and second portions of said air passage in said valve body are offset axially with one another.

5. The system of claim 1 in which said inner ends of said first and second portions of said air passage are aligned with one another.

6. The system of claim 1 in which said recess and land of said valve spool extend in generally transverse relationship to the direction of movement of said spool in said chamber of said body.

7. The system of claim 1 in which said valve body has a central bore defined therein and said valve spool includes an actuating shaft disposed in said bore for reciprocal movement therealong.

8. The system of claim 1 further comprising means disposed in said chamber of said valve body and engaging said valve spool for biasing said spool to its valve closing position.

9. The system of claim 1, further comprising a sealing assembly disposed between said housing and valve body.

10. The system of claim 9 in which said sealing assembly includes:
    a flexible ring having an outer annular base portion engaged with the interior of said housing and an inner annular flexible wall portion adapted to engage the exterior of said valve body and form a curled inner peripheral edge; and
    an expanded flexible band which seats in said curled inner edge of said wall portion for establishing an air-tight seal between said inner edge of said ring and said valve body.

11. A valve system for remotely controlling the inflation pressure within a pneumatic tire of a wheel mounted for rotation on a axle of a vehicle comprising:
- a valve assembly housing disposable in and attachable to said axle;
- an air manifold attachable to said wheel for rotation therewith and relative to said valve assembly housing, said manifold having an air channel connectable in communication with said pneumatic tire of said wheel;
- a valve assembly including a valve body disposable in said housing and being connectable to said air manifold for rotation therewith relative to said housing, said valve body having a hollow chamber and an air passage defined therethrough communicating with said air channel of said manifold when said body is connected thereto, said valve assembly also including a valve spool disposed in said chamber of said valve body and being reciprocally movable therein relative to said body between valve opening and closing positions in which said valve spool respectively establishes and blocks communication from said air passage of said valve body to said air channel of said manifold;
- an electrical pressure transducer mounted to said manifold for movement therewith and disposed in communication with said manifold air channel for sensing air pressure therein;
- means for transmitting electrical signals including a trailing portion connected to said transducer for movement therewith upon rotation of said transducer with said manifold and a leading portion extending through a portion of said housing in a stationary relationship thereto; and
- means disposed between said rotatable valve body and said stationary housing for electrically coupling said leading and trailing portions of said transmitting means together.

12. The system of claim 11 in which said coupling means includes an inner ring electrically connected to said trailing portion of said transmitting means and being mounted to an exterior side of said valve body and in spaced relation to the interior side of said housing, and an outer ring electrically connected to said leading portion of said transmitting means and being mounted to said interior side of said housing and in spaced relation to said inner ring and said exterior side of said valve body and in electrically inductively coupled relationship to said inner ring for inductively transmitting signals between said leading and trailing portions of said transmitting means.

13. A valve system for remotely controlling the inflation pressure within a pneumatic tire of a wheel mounted for rotation on an axle of a vehicle, said axle having a hollow cavity, said system comprising:
- a valve housing stationarily disposed in said hollow cavity of said axle and attached thereto;
- an air manifold attachable to said wheel for rotation therewith and relative to said valve housing, said manifold extending across an end of said hollow cavity of said axle and having an air channel connectable in communication with said pneumatic tire of said wheel;
- a valve body disposable in said housing adjacent said end of said hollow axle cavity, said body being connectable to said air manifold for rotation therewith relative to said housing, said valve body having a hollow chamber and an air passage defined therein, said air passage having a first portion communicating at its outer end with the interior of said housing and at its inner end with said chamber and a second portion communicating at its inner end with said chamber and at its outer end with said air channel of said manifold when said valve body is disposed in said housing and connected to said manifold;
- a valve spool disposed in said chamber of said valve body and reciprocally movable therein relative to said body between valve opening and closing positions, said spool having a recess defined therein which establishes communication between said inner ends of said first and second portions of said air passage in said body when said spool is moved to its valve opening position, said spool having a land defined thereon which blocks communication between said inner ends of said first and second portions of said air passage in said body when said spool is moved to its valve closing position;
- an electrical pressure transducer disposed adjacent said valve body and mounted to said manifold for movement therewith and at a side thereof facing said hollow cavity of said axle, said transducer being disposed in communication with said air channel of said manifold;
- flexible cable for transmitting electrical signals including a trailing portion connected to said transducer for movement therewith upon rotation of said transducer with said manifold and a leading portion extending through a portion of said housing in a stationary relationship thereto; and
- means disposed between said rotatable valve body and said stationary valve housing for electrically inductively coupling said leading and trailing portions of said cable together.

14. The system of claim 13 in which said air manifold includes:
- an outer hub cap disposable across said end of said hollow cavity in said axle and said housing;
- a connector mounted on the periphery of said hub cap;
- an inner ring attached on the interior of said hub cap and defining a central portion of said air channel therewith; and
- at least one sleeve extending between said ring and said connector on the periphery of said hub cap for defining a branch of said air channel leading from said central portion thereof to said connector.

15. The system of claim 14 in which said pressure transducer is mounted to said inner ring and communicates with another branch of said air channel leading from said central portion thereof.

16. The system of claim 13 in which said recess and land of said valve spool extend in generally transverse relationship to the direction of movement of said spool in said chamber of said body.

17. The system of claim 13 in which said valve body has a central bore defined therein and said valve spool includes an actuating shaft disposed in said bore for reciprocal movement therealong.

18. The system of claim 13, further comprising means disposed in said chamber of said valve body and engaging said valve spool for biasing said spool to its valve closing position.

19. The system of claim 13, further comprising a sealing assembly disposed between said housing and valve body adjacent said electrical inductive coupling rings.

20. The system of claim 19 in which said sealing assembly includes:

a flexible ring having an outer annular base portion engaged with the interior of said housing and an inner annular flexible wall portion adapted to engage the exterior of said valve body and form a curled inner peripheral edge; and an expanded flexible band which seats in said curled inner edge of said wall portion for establishing an air-tight seal between said curled edge of said ring and the valve body.

* * * * *